(12) United States Patent
LaBranche et al.

(10) Patent No.: US 8,617,428 B2
(45) Date of Patent: Dec. 31, 2013

(54) THICK FILM RESISTIVE HEATER COMPOSITIONS COMPRISING AG AND $RUO_2$, AND METHODS OF MAKING SAME

(75) Inventors: Marc H. LaBranche, Chapel Hill, NC (US); Kenneth Warren Hang, Cary, NC (US)

(73) Assignee: E I du Pont de Nemours and Company, Wilmington, DE (US)

( * ) Notice: Subject to any disclaimer, the term of this patent is extended or adjusted under 35 U.S.C. 154(b) by 124 days.

(21) Appl. No.: 13/292,642

(22) Filed: Nov. 9, 2011

(65) Prior Publication Data

US 2012/0164314 A1 Jun. 28, 2012

Related U.S. Application Data

(60) Provisional application No. 61/427,679, filed on Dec. 28, 2010.

(51) Int. Cl.
  *H01B 1/22* (2006.01)
  *B05D 5/12* (2006.01)
  *H01C 17/065* (2006.01)

(52) U.S. Cl.
  USPC .......................................... 252/514; 427/125

(58) Field of Classification Search
  USPC ................... 252/512–514; 427/125
  See application file for complete search history.

(56) References Cited

U.S. PATENT DOCUMENTS

| | | |
|---|---|---|
| 3,681,261 A | 8/1972 | Mason et al. |
| 4,051,074 A | 9/1977 | Asada |
| 4,160,227 A | 7/1979 | Ikegami et al. |
| 4,362,656 A | 12/1982 | Hormadaly |
| 4,476,039 A | 10/1984 | Hormadaly |
| 4,539,223 A | 9/1985 | Hormadaly |
| 4,845,340 A | 7/1989 | Goessler et al. |
| 5,068,517 A | 11/1991 | Tsuyuki et al. |
| 5,083,168 A | 1/1992 | Kusaka et al. |
| 5,096,619 A | 3/1992 | Slack |
| 5,162,062 A | 11/1992 | Carroll et al. |
| 5,162,635 A | 11/1992 | Sato et al. |

(Continued)

FOREIGN PATENT DOCUMENTS

EP 0 115 798 A1 8/1984
EP 0 958 712 B1 5/2006

(Continued)

OTHER PUBLICATIONS

PCT International Search Report and Written Opinion mailed Apr. 20, 2012.

*Primary Examiner* — Mark Kopec

(57) ABSTRACT

Thick film resistor paste compositions, and methods for making the thick film compositions are disclosed. The compositions include a resistor composition dispersed in an organic vehicle. The resistor composition has 3 to 60% by weight $RuO_2$ conductive material, 5 to 75% by weight Ag conductive material, 15 to 60% by weight glass frit and optionally up to 10% by weight copper oxide or precursor thereof, and up to 20% by weight bismuth oxide or precursor thereof.

The resistor composition when printed to a dry thickness and fired at a temperature between 750° C. and 950° C. achieves a sheet resistivity between 10 and 10,000 milliohms/square and a hot temperature coefficient of resistivity of 1000 ppm/C or higher. The fired resistor composition may achieve a resistance thickness ratio ($R_{tr}$) value between 0.75 and 1.50.

13 Claims, 1 Drawing Sheet

(56) References Cited

U.S. PATENT DOCUMENTS

| | | | |
|---|---|---|---|
| 5,304,784 A | 4/1994 | Tagashira et al. | |
| 5,510,823 A | 4/1996 | Tanaka et al. | |
| 5,534,194 A | 7/1996 | Borland et al. | |
| 5,898,360 A | 4/1999 | Lim | |
| 5,900,295 A | 5/1999 | Kawada | |
| 6,046,438 A | 4/2000 | Slegt | |
| 6,174,462 B1 | 1/2001 | Oka et al. | |
| 6,406,646 B1 | 6/2002 | Lee et al. | |
| 6,444,297 B1 | 9/2002 | Bischel | |
| 6,733,695 B2 | 5/2004 | Onami et al. | |
| 6,733,696 B2 | 5/2004 | Anao | |
| 6,763,712 B1 | 7/2004 | Crosbie et al. | |
| 7,037,448 B2 | 5/2006 | Nagai et al. | |
| 7,280,028 B2 | 10/2007 | Nelson et al. | |
| 7,326,370 B2 | 2/2008 | Barker et al. | |
| 7,381,353 B2 | 6/2008 | Lee et al. | |
| 7,544,314 B2 * | 6/2009 | Tanaka et al. | 252/518.1 |
| 2004/0094533 A1 | 5/2004 | Gerhardinger | |
| 2005/0016986 A1 | 1/2005 | Ito | |
| 2009/0134144 A1 | 5/2009 | Shaw et al. | |
| 2010/0101950 A1 | 4/2010 | Sakurai et al. | |

FOREIGN PATENT DOCUMENTS

| | | |
|---|---|---|
| EP | 0 916 234 B1 | 6/2006 |
| GB | 1 210 493 A | 10/1970 |
| JP | 53-100496 A | 9/1978 |
| WO | 93/23855 A1 | 11/1993 |
| WO | 2007/131648 A3 | 11/2007 |

* cited by examiner

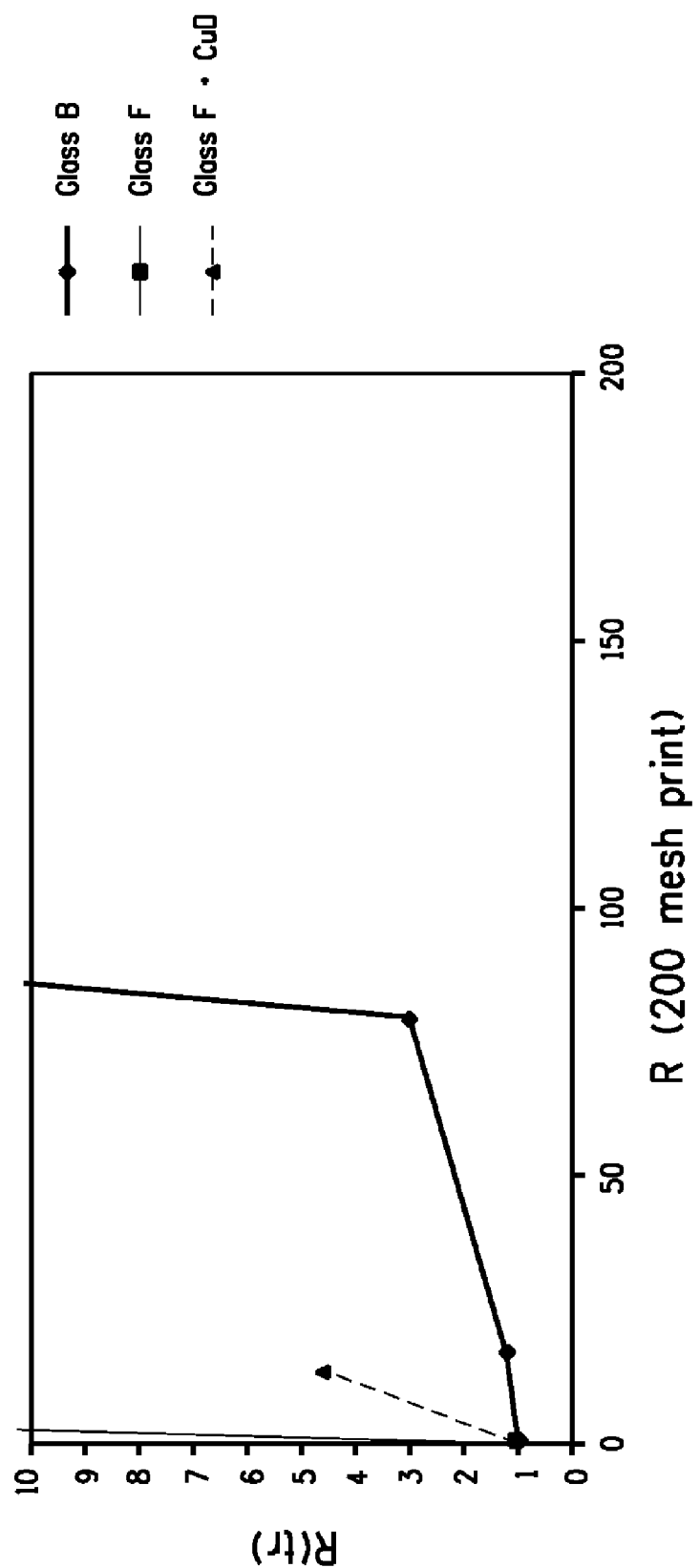

THICK FILM RESISTIVE HEATER COMPOSITIONS COMPRISING AG AND RUO₂, AND METHODS OF MAKING SAME

FIELD OF THE INVENTION

The invention is directed to thick film compositions including Ag & $RuO_2$ and optionally including certain novel glass compositions, which have improved resistivity control and high temperature coefficients of resistivity, and methods for making the thick film compositions.

BACKGROUND OF THE INVENTION

Thick film materials generally are mixtures of metal, glass and/or ceramic powders dispersed in an organic vehicle. These materials are applied to substrates to form conductive, resistive or insulating films. Thick film materials are used in a wide variety of electronic and light electrical components.

The properties of individual compositions depend on the specific constituents which comprise the compositions. All compositions contain three major components. The conductive phase determines the electrical properties and influences the mechanical properties of the final film. In conductor compositions, the conductive phase is generally a precious metal or mixture of precious metals. In resistor compositions the conductive phase is generally a metallic oxide. In dielectric compositions, the functional phase is generally a glass or ceramic.

The binder is usually a glass, a crystalline oxide or a combination of the two. The binder holds the film together and to the substrate. The binder also influences the mechanical properties of the final film.

The vehicle is a solution of polymers in organic solvents. The vehicle determines the application characteristics of the composition.

In the composition, the functional phase and binder are generally in powder form and have been thoroughly dispersed in the vehicle.

Thick film materials are always applied to a substrate. Thick film technology is defined as much by the processes as by the materials or applications. The basic thick film process steps are screen printing, drying and firing. The thick film composition is generally applied to the substrate by screen printing. Dipping, banding, brushing or spraying are occasionally used with irregular shaped substrates.

The screen printing process consists of forcing the thick film composition through a stencil screen onto the substrate with a squeegee. The open pattern in the stencil screen defines the pattern which will be printed onto the substrate.

After printing, the film is dried and fired, generally in air. This process forms a hard, adherent film with the desired electrical and mechanical properties.

Additional thick film compositions may be applied to the same substrate by repeating the screen printing, drying and firing processes. In this way, complex, inter-connected conductive, resistive and insulating films can be generated.

One particular application of thick film materials are thick film heater compositions which are widely used in the electronics industry. Heaters can be fired onto a variety of substrates such as 96% alumina, aluminum nitride, stabilized zirconia and 430 grade stainless steel.

High temperature heaters, for instance, for oxygen sensors that are required to operate above 600° C. to 700° C., typically are based on platinum metal as the conductor element. Alternately, high temperature heaters may employ a base metal such as tungsten or molybdenum co-fired within an alumina package.

U.S. Patent Application Publication 2010/0101950A1, entitled "Ceramic Junction Member, Ceramic Heater and Gas Sensor" assigned to NGK Spark Plug Co, Ltd., discloses W and Mo heaters used with alumina. U.S. Pat. No. 7,280,028, entitled "Temperature Sensor and Method of Making the Same, assigned to Delphi Technologies, inc., discloses disposing a film of platinum, rhodium, palladium and mixtures and alloys thereof on a substrate to provide a fast action $O_2$ sensor. U.S. Pat. No. 5,898,360 entitled "Heater for Heating an Automobile Sensor, assigned to Samsung Electro Mechanics, Inc., discloses a ceramic heater with improved durability having an electrode made from platinum and at least one lanthanide oxide.

U.S. Pat. No. 6,444,297, entitled "Method of Producing a Thick Film Metallization on an Aluminum Nitride Substrate", assigned to Electro Technik Industries, Inc., discloses a metallization layer structure is applied to an aluminum nitride substrate by the application of an intermediate buffer layer of either silicon monoxide or silicon dioxide. Additionally, a resistive thick film, such as described in U.S. Pat. No. 4,539,223, may be added to the metallization layer.

Lower temperature heaters, on the other hand, can be based on silver as the metallization. One example is a kettle heater (see "DuPont Users' Guide for DuPont HEATEL® Inks For Heating Applications on Steel Substrates").

Heating elements used in ceramic heaters, cooking appliances and the like are also disclosed in U.S. Patent Application Publications 2004/0094533, 2005/0016986 and 2009/0134144, U.S. Pat. Nos. 4,845,340 and 6,046,438, and European Patent Specification EP 0958712. None of the systems disclosed use a combination of Ag and $RuO_2$.

Silver-based heaters have the dual benefits of lower cost vs. platinum heaters, and the ability to be air fired compared with tungsten or molybdenum heaters that require controlled atmosphere firing. Such heaters can be fabricated with resistor of various conductivities, including a resistivity of approximately the bulk value of the conductor employed. However, there are needs in the industry for sheet resistances higher than that of the pure metal, e.g., silver. Accordingly, one difficulty with the approach of using silver as the conducting material is that it has a sheet resistivity of around 1.6 milliohms/square when fired to 10 microns thickness. Furthermore, with thick film heaters based on low-cost silver compositions, there can be difficulties in controlling the resistance of the fired layers.

In considering the need for a higher ohm, silver-based commercial heater resistor compositions, the inventors have considered this may require substantial modification of the silver-containing composition to raise the sheet resistance. Although it was considered that such modification could be done by dilution of silver with glass and possibly other additives, there are considerable difficulties and problems encountered in controlling the resistivity of the silver-based heaters. As the sheet resistivity is formulated to higher values, the coefficient of variation (CV) typically increases. Also, quite unexpectedly, the fired heater resistors show a sensitivity to print thickness that is more severe than an inverse thickness calculation would predict. Although not wishing to be bound by any particular theory or hypothesis, this thickness sensitivity and undesirable variability of the resistivity value is thought to possibly be due to silver sintering and coarsening as the printed film increases in thickness.

This problem, as described above, is not discussed in U.S. Pat. No. 5,304,784 which discloses that a heater may be formed of silver-palladium paste, or alternately, of RuO2 paste; U.S. Pat. No. 5,162,635 which discloses an electrically conductive section 24 made of RuO2 or silver; U.S. Pat. No. 5,083,168 which discloses that resistor 22 may be made from silver/palladium, RuO2 or nickel; or U.S. Pat. No. 5,068,517 which discloses that a strip heater element 22 may be made from only silver-palladium alloy, or a mixture of the silver-palladium alloy and RuO2. The strip heater element 23 is covered with a protective layer 24 formed by coating with frit glass and backing the frit glass.

The problem solved by the present invention is not discussed in U.S. Pat. No. 6,406,646, which discusses the disadvantages of the processes and paste compositions disclosed in JP 53-100496, U.S. Pat. No. 5,510,823 and Korean Patent No. 130831 issued to DuPont because they require a high calcination temperature ranging from about 600 to 1,000° C. thus limiting their application to substrates which can stand such a high temperature. U.S. Pat. No. 6,406,646 discloses a resistive paste composition comprising Ru metal or $RuO_2$ particles, silver(Ag) metal or compounds, a glass frit having a softening point of 400 to 550° C. and an organic binder. The paste is calcined at a low temperature of about 500 to 600° C.

U.S. Pat. No. 5,510,823 discusses JP 53-100496 in great detail and concludes that process has numerous disadvantages, including that the thick resistive element film-forming paste is an non uniform mixture of a glass frit powder and a ruthenium oxide powder, the resulting resistive value varies widely or the strength to electric field is low, the resistive value suddenly changes with a change in applied voltage, it is difficult to control the resistive value of the resulting resistive element by the composition ratio of a glass powder and a ruthenium oxide powder alone, and the difference in grain diameter between glass powder and ruthenium oxide powder or the variation of calcining temperature causes a great dispersion of resistive value. It is further stated that even if the composition ratio and the average grain diameter are kept constant, the resistive value of the resulting resistive elements of JP 53-100496 differ greatly. U.S. Pat. No. 5,510,823 relates to a resistive element for use in various electronic components such as hybrid integrated circuit and thermal head and proposes and claims a resistive element film-forming paste, which comprises (1) an organic metal compound, (2) at least one additive selected from organic nonmetal compounds and organic metal compounds, and (3) a solution of asphalt dissolved in a solvent.

Commonly assigned U.S. Pat. No. 5,162,062 discloses an invention directed to a technique for developing improved conductor aged adhesion over dielectric layers. It is suitable for both glassy and filled glass dielectric systems, as well as for crystallizing and filled crystallizing systems. It is especially useful for the crystallizing and filled crystallizing type of systems on account of the difficulty in bonding conductors to crystallized glass layers. Disclosed as a part of the method is a patterned layer of thick film conductor paste comprising (a) a silver-containing metal selected from Ag, alloys and mixtures of Ag with a minor amount of Pd and/or Pt, (b) an amorphous glass binder, (c) a sintering inhibitor selected from oxides of ruthenium and rhodium, mixtures and precursors thereof, all of (a), (b), and (c) being dispersed in an organic medium.

Despite all of the considerable efforts described above, a need exists for compositions and methods for forming silver based heaters having sheet resistances higher than that of the pure silver metal, that is, which are able to be consistently and uniformly processed to raise the sheet resistivity to higher values, with acceptable control of HTCR values, and without negatively impacting the coefficient of variation (CV) and furthermore without unpredictable sensitivity to print thickness. Moreover, a need exists for methods and compositions that can produce resistors that are more uniform in fired performance, and can yield a resistivity that varies more closely with the inverse print thickness in order to more easily predict the fired heater resistance based upon the actual print thickness employed.

SUMMARY OF THE INVENTION

The invention provides compositions and methods for forming silver based heaters (a) that are more uniform in fired performance, (b) yield a resistivity that varies more closely with the inverse print thickness, (c) allow more easily predictable fired heater resistance based upon the actual print thickness employed, (d) which are able to be consistently and uniformly processed to target sheet resistivity and HTCR values, and (e) have improved coefficient of variation (CV).

In embodiments of the invention, a thick film resistor paste composition is provided comprising a resistor composition dispersed in an organic vehicle, the resistor composition comprising: (i) 3 to 60% by weight $RuO_2$ conductive material, (ii) 5 to 75% by weight Ag conductive material, (iii) 15 to 60% by weight glass frit wherein the glass comprises by weight 25-45% $SiO_2$, 2-15% $Al_2O_3$, 0-3% $ZrO_2$, 0-8% $B_2O_3$, 5-15% CuO, 0-8% BaO, 0-3% $P_2O_5$, and 20-50% $Bi_2O_3$, and optionally (iv) 0 to 10% by weight copper oxide or precursor thereof, and (v) 0 to 20% by weight bismuth oxide or precursor thereof, wherein the resistor composition when printed to a dry thickness and fired at a temperature between 750° C. and 950° C. achieves a sheet resistivity between 10 and 10,000 milliohms/square when printed to a dry thickness of 25.4 microns, and a hot temperature coefficient of resistivity of 1000 ppm/C or higher.

In other embodiments of the invention a thick film resistor paste composition is provided comprising a resistor composition dispersed in an organic vehicle, said resistor composition comprising (i) 3 to 60% by weight $RuO_2$ conductive material, (ii) 5 to 75% by weight Ag conductive material, (iii) 15 to 60% by weight glass, and optionally (iv) 0 to 10% by weight copper oxide or precursor thereof, and (v) 0 to 20% by weight bismuth oxide or precursor thereof wherein said resistor composition when printed to a dry thickness and fired at a temperature between 750° C. and 950° C. achieves a sheet resistivity between 10 and 10,000 milliohms/square, a hot temperature coefficient of resistivity of 1000 ppm/C or higher and a resistance thickness ratio ($R_{tr}$) value between 0.75 and 1.50.

In further embodiments of the invention methods of forming a fired resistor composition on a substrate are provided, comprising the steps of:
 (a) forming on said substrate a thin layer of thick film resistor paste composition comprising a resistor composition dispersed in an organic vehicle, said resistor composition comprising 3 to 60% by weight $RuO_2$ conductive material, 5 to 75% by weight Ag conductive material, 15 to 60% by weight glass,
 (b) drying said thin layer,
 (c) firing said dried layer between 800° C. and 950° C. to form a fired resistor composition with a sheet resistivity between 10 and 10,000 milliohms/square and a hot temperature coefficient of resistivity of 1000 ppm/C or higher.

Palladium can also be employed in embodiments of the invention to reduce and/or control HTCR. In particular the conductive material may be selected from the group consisting of Ag and mixtures of Ag and Pd, wherein the mixture of Ag and Pd comprises 90% to 99.99% by weight Ag and 0.01% to 10% by weight Pd, based upon the weight of the mixture of Ag and Pd.

BRIEF DESCRIPTION OF THE DRAWINGS

FIG. 1 shows a plot of the relationship between sheet resistance values and $R_{tr}$ for Comparative Examples 1-4.

DETAILED DESCRIPTION OF THE INVENTION

Glass Compositions

In Table 1, a series of glass compositions in accordance with the invention are listed as illustrative of glass materials that may be used in paste formulations in accordance with the invention to achieve desired resistor property characteristics. These glass materials may be used as mixtures of one or more glass compositions. Optionally, one of more oxides of bismuth and/or copper may be required in order to achieve a final composition in accordance with the invention, comprising conductive material such as ruthenium oxide and silver, a glass or glass mixture, and added oxides or oxide precursors formulated in an organic medium to form a paste suitable for application to a substrate.

TABLE 1

Glass Frit Compositions

|  | A | B | C | D | E | F |
|---|---|---|---|---|---|---|
| $SiO_2$ | 7.11 | 38.64 | 32.15 | 29.79 | 29.95 | 35.99 |
| $Al_2O_3$ | 2.13 |  | 2.9 | 2.87 | 10.17 | 14.00 |
| $ZrO_2$ |  | 2.52 |  | 1.53 |  |  |
| $B_2O_3$ | 8.38 |  | 6.34 | 6.28 | 1.16 | 1.30 |
| CaO | 0.53 | 14.76 |  |  |  |  |
| ZnO | 12.03 | 29.97 |  |  |  |  |
| CuO |  |  | 12.68 | 12.55 | 13.22 | 13.90 |
| BaO |  | 12.66 | 3.49 | 3.46 | 6.79 | 5.74 |
| $Bi_2O_3$ | 69.82 |  | 42.44 | 42 | 38.71 | 29.07 |
| $P_2O_5$ |  | 1.45 |  | 1.52 |  |  |
|  | 100 | 100 | 100 | 100 | 100 | 100 |

When the glass or glasses, ruthenium dioxide and silver, and optionally added copper and/or bismuth oxides are formulated to make a paste, then printed and dried to form a thin layer on a suitable substrate provided with terminating conductor pads, and the layer is then thermally processed, it is expected to yield a resistive layer termed a "thick film resistor."

The glasses were melted in platinum rhodium alloy crucibles at a temperature in the range of 1350 to 1550° C. The batch materials were oxide materials with the exception of alkali and alkaline earth oxide constituents that were batched in the form of their respective carbonates. The batch materials were weighed and mixed thoroughly before melting. The phosphorous pentoxide was added in the form of a pre-reacted phosphate compound, such as $Ba_2P_2O_7$, $BaP_2O_6$, or $BPO_4$; however, the choice is not limited to these examples. The boron was added as boric anhydride. Amorphous silica was used as the source of $SiO_2$. The glass was melted for 1 to 4 hours, stirred, and quenched. The glass was quenched in water or by metal roller. The glass was then ball milled in water to a 5 to 7 micron powder using ½" zirconia cylinder media. The glass slurry was screened through a 325-mesh screen to remove the potential presence of oversize particles. The slurry was dried at 100° C. and then milled again in water to a final $d_{50}$ size of about 1 to 2 micron. The dried glass powder was then baked to 175° C. and was then ready to be used in resistor formulation. This drying step was used to remove surface moisture.

Paste Formulation

Typically, a resistor paste consists of conductive particles, glass powder, and optional additives dispersed in an organic medium to produce a screen-printable paste. The procedures for making such paste are known in the art, for example, as disclosed in commonly assigned U.S. Pat. No. 4,539,223, the disclosure of which is incorporated by reference herein in its entirety. In certain exemplified embodiments of the invention, the paste contains 75 weight % of $RuO_2$ and Ag conductive and glass composition(s) from Table 1 and optional additional oxides of copper and/or bismuth. In other embodiments of the invention total solids may range from 30-90 weight %, or 60-85 weight %.

The $RuO_2$ used is a fine powder with a surface area in the range of 10 to 70 $m^2/g$. The surface area used in the examples was 25.4 $m^2/g$. In embodiments of the invention the $RuO_2$ used is a sub micron particle size powder.

The silver powder used is a fine powder with an average size preferably below 10 microns in order to ensure a uniform fired film. Flake, spherical and irregular morphologies can be employed in the present invention. The powder used in the examples is shown in Table 2.

TABLE 2

Silver Powder Used in the Examples

| Tap Density | Surface Area | $d_{50}$ | $d_{90}$ |
|---|---|---|---|
| 4.6 g/cc | 0.62 $m^2/g$ | 1.70 microns | 6.95 microns |

The copper oxide is any finely divided material suitable for thick film applications. It can be cupric oxide (CuO) or a suitable precursor. The actual material used in the examples was cupric oxide from JT Baker, with a surface area of 0.4 $m^2/g$. The bismuth oxide $Bi_2O_3$ is also any finely divided material or precursor suitable for thick film applications. The actual material used was also JT Baker material, but vibratory milled to an average particle size of 0.4 microns. In embodiments of the invention the cupric oxide (CuO) or a suitable precursor and/or the bismuth oxide $Bi_2O_3$ may be a sub micron particle size powder.

The inorganic components were mixed with an organic medium by mechanical mixing to form viscous compositions called "pastes," having suitable consistency and rheology for screen printing. A wide variety of inert viscous materials can be used as the organic medium. The organic medium is one in which the inorganic components are dispersible with an adequate degree of stability. The rheological properties of the medium are such that they lend good application properties to the composition, including: stable dispersion of solids, appropriate viscosity and thixotropy for screen printing, appropriate wettability of the substrate and the paste solids, a good drying rate, and good firing properties. The organic medium used in the thick-film composition of the present invention may be a non-aqueous inert liquid. Use can be made of any of various organic mediums, which may or may not contain thickeners, stabilizers, and/or other common additives. The organic medium is typically a solution of polymer(s) in solvent(s). Additionally, a small amount of additives, such as surfactants, may be a part of the organic medium. The most frequently used polymer for this purpose is ethyl cellulose. Other examples of polymers include ethyl hydroxyethyl cellulose, wood rosin, mixtures of ethyl cellulose and phenolic resins, polymethacrylates of lower alcohols, and monobutyl ether of ethylene glycol monoacetate can also be used. The most widely used solvents found in thick-film compositions are ester alcohols and terpenes such as alpha or beta terpineol or mixtures thereof with other solvents such as kerosene, texanol, dibutyl phthalate, butyl carbitol, butyl carbitol acetate, hexylene glycol, and high-boiling alcohols and alcohol esters. In addition, volatile liquids for promoting rapid hardening after application on the substrate can be included in the medium. Suitable surfactants for $RuO_2$-based resistors include soya lecithin and alkali phosphates. Various combinations of these and other solvents are formulated to obtain the viscosity and volatility requirements desired. The vehicle was used in the current examples was terpineol plus ethyl cellulose plus Gafac RE-610 phosphate surfactant from Rhone-Poulenc.

The ratio of organic medium in the thick-film composition to the inorganic components in the dispersion is dependent on the method of applying the paste and the kind of organic medium used, as well as the desired print thickness achieved from screen printing. Usually, the dispersion will contain 40 to 80 weight % of inorganic components and 60 to 20 weight % of organic medium.

The powders were wetted by the organic medium by centrifugal mixing. The examples were 50 grams batch size, and used a Thinky mixer (Laguna Hills, Calif.). Impeller stirrers could be used for mixing larger volumes of paste. Final dispersion of powder particles was accomplished by the use of a three-roll mill such as the Ross (Hauppauge, N.Y.) three-roll mill (floor model with 4 inch [10.16 cm] diameter×8 inch [20.32 cm] long rolls). A final paste viscosity between 100 and 300 Pa-sec. was used for screen printing (as measured at 10 rpm and 25° C. with a Brookfield HBT viscometer [Middleboro, Mass.] with #14 spindle and 6R cup). Occasionally smaller samples were made by blending previously roll milled compositions with a Thinky mixer or on a glass surface. Screen printing was accomplished using an automatic screen printer (such as those from Engineering Technical Products, Sommerville, N.J.). A 200 square, 0.040" wide serpentine pattern was employed. Prints were made with both a 325 mesh and a 200 mesh stainless steel screen to achieve dried thicknesses in the approximate range 10-16 and 20-35 microns, respectively. The resistors were printed on 1 inch (2.54 cm) squares of 96% alumina substrates. The substrates were 25 mils (0.635 mm) in thickness and were produced by CoorsTek (Golden, Colo.). The resistors were printed on a pattern of Ag thick-film terminations that had been previously fired to 850° C. DuPont Pb-free, Ag/Pt LF171 termination was fired using the recommended 30 minute firing profile with 10 minutes at the peak firing temperature (DuPont MicroCircuit Materials, Research Triangle Park, N.C.). Resistors were also fired at 850° C. using a 30 minute profile with 10 minutes at the peak temperature. Where noted, two layers of QM44 dielectric were printed and fired onto the alumina substrates prior to the LF171 prints. Also where noted, a layer of 3500N dielectric and then a layer of QM44 dielectric were printed and fired onto 1×1" pieces of 430 stainless steel prior to the LF171 prints. The QM44 and the 3500N were fired at the same 850° C. profile as the LF171 and the resistors. A Lindberg Model 800 (Riverside, Mich.) 10-zone belt furnace with 233.5 inch (593.1 cm) belt length was used for all firings.

Resistances were measured at 25° C. and 150° C. using a four-point probe method. A Keithley 2000 multimeter and Keithley 224 programmable current source (Cleveland, Ohio) were used to carry out the measurements. An S & A Engineering 4220AQ thermal test chamber (Scottsdale, Ariz.) was used to achieve the two measurement temperatures. Data is reported as R/sq. at 25° C. The HTCR is defined as $[(R_{150° C.} - R_{25° C.})/(\Delta \times R_{25° C.})] \times 1,000,000$. The unit of HTCR is ppm/° C. Unless where otherwise noted, five parts were averaged to provide a resistance and HTCR value.

Resistor thicknesses were measured in the dried state, and the resistivities were normalized to 25.4 microns dry thickness using a 1/thickness dependence. The dried resistor thicknesses were measured with a contact-type profilometer made by KLA-Tencor, Model AS-500. A resistance thickness ratio $R_{tr}$ was defined as the (resistivity normalized to 25.4 microns when printed with 325 mesh screen)/(resistivity normalized to 25.4 microns when printed with 200 mesh screen). If a resistor follows a 1/thickness dependence across that thickness range, then the normalized resistivity with the 200 mesh and 325 mesh prints should be approximately the same and $R_{tr}$ would be 1.0. A deviation away from a value of 1.0 provides a measure of the thickness sensitivity of a resistor.

Formulation and Application

In the methods in accordance with the present invention the particulate inorganic solids may be mixed with the organic carrier and dispersed with suitable equipment, such as a three-roll mill, to form a suspension, resulting in a composition for which the viscosity will be in the range of about 100-150 pascal-seconds at a shear rate of 4 sec.sup.-1. The ingredients of the paste, minus about 5% organic components equivalent to about 5% wt., are weighed together in a container. The components are then vigorously mixed to form a uniform blend: then the blend is passed through dispersing equipment, such as a three roll mill, to achieve a good dispersion of particles. A Hegman gauge is used to determine the state of dispersion of the particles in the paste. This instrument consists of a channel in a block of steel that is 25 microns deep (1 mil) on one end and ramps up to 0" depth at the other end. A blade is used to draw down paste along the length of the channel. Scratches will appear in the channel where the agglomerates' diameter is greater than the channel depth. A satisfactory dispersion will give a fourth scratch point of 10-18 typically. The point at which half of the channel is uncovered with a well dispersed paste is between 3 and 8 typically. Fourth scratch measurement of >20 microns and "half-channel" measurements of >10 microns indicate a poorly dispersed suspension.

The remaining 5% consisting of organic components of the paste is then added, and the resin content is adjusted to bring the viscosity when fully formulated to between 140 and 200 Pa·s at a shear rate of 4 sec.sup.-1. The composition is then applied to a substrate, usually by the process of screen printing. The resistive compositions of this invention can be printed onto the substrates either by using an automatic printer or a hand printer in the conventional manner, preferably automatic screen stencil techniques are employed using a 200 to 325 mesh screen. The printed pattern is then dried at below 200° C., about 150° C., for about 5-15 minutes before firing. The thickness of the dried pattern is in the range of 3-50 microns, or 5-30 microns. Firing to effect sintering of both the inorganic binder and the finely divided particles of metal is preferably done in a well ventilated belt conveyor furnace with a temperature profile that will allow burnout of the organic matter at about 300 to 600° C., a period of maximum temperature of about 750 to 950° C. lasting about 5-15 minutes, followed by a controlled cool-down cycle to prevent over-sintering, unwanted chemical reactions at intermediate temperatures or substrate fracture which can occur from too rapid cool-down. Total firing cycle times in the range of 30-60 minutes may be used.

EXAMPLES

Silver powder and Glass B were mixed at two different weight ratios to form two resistor compositions, and roll milled with organic to form two resistor paste compositions. The weight of the silver powder plus glass frit was 75% of the weight of the total paste, and the balance of the paste was 2.5% surfactant and 22.5% of a solution made up of 90% terpineol and 10% ethyl cellulose.

The pastes were each printed through both 325 and 200 mesh screens, the resistivities were normalized to 25.4 microns dry thickness, and the resulting resistivity ratios $R_{rt}$ are reported. For the 50% silver composition in Example 1, the 325 mesh print did not yield a measurable resistance, though the 200 mesh print produced a resistivity of 187 milliohms/sq at 25.4 microns dry thickness, yielding an infinite $R_{rt}$. The resistivity of the 325 mesh print of the 52.5% Ag composition of Example 2 was measureable, however, $R_{rt}$ was still a relatively high value of 3.0.

Similar results were obtained with silver powder mixed with Glass F. Example 3 had an infinite $R_{rt}$ with 70% silver/30% glass frit, and Example 4 had a value of 4.55 with copper oxide substituted for 2% of the glass.

The Examples 1-4 are comparative examples for the purpose of this invention. They show the difficulty in formulating with just silver powder and glass frit to achieve resistivities significantly higher than the bulk value of silver metal. These examples did not use ruthenium dioxide.

TABLE 3

|  | 1 | 2 | 3 | 4 |
|---|---|---|---|---|
| Glass A |  |  |  |  |
| Glass B | 50.00% | 47.5% |  |  |
| Glass C |  |  |  |  |
| Glass D |  |  |  |  |
| Glass E |  |  |  |  |
| Glass F |  |  | 30.00% | 28.00% |
| CuO |  |  |  | 2.00% |
| Bi$_2$O$_3$ |  |  |  |  |
| RuO$_2$ |  |  |  |  |
| Ag | 50.00% | 52.5% | 70.00% | 70.00% |
| 200 mesh thickness | 27.2 | 27.0 | 22.1 | 24.2 |
| 325 mesh thickness | 17.1 | 15.6 | 10.3 | 11.4 |
| R(25.4) 200 mesh print | 187 | 79 | 22 | 16 |
| R(25.4) 325 mesh print | Offscale | 237 | offscale | 73 |
| HTCR 200 mesh print | 3537 | 3541 | 3665 | 3579 |
| HTCR 325 mesh print | Offscale | 3529 | Offscale | 3855 |
| $R_{rt}$ 325 mesh/200 mesh | Infinite | 3.000 | infinite | 4.553 |

FIG. 1 is a plot of Comparative Examples 1-4 and shows that although Rtr values in the range of 3 to 4.5 may be obtained in certain instances without the use of ruthenium dioxide, the overwhelming physical property of these Comparative Examples is their tendency to exhibit an extremely sharp rise (to offscale) in the Rtr value as resistivity is increased.

In contrast to the Comparative Examples 1-4, Examples 5 and 6 use Glass B and Glass F, respectively, formulated with RuO$_2$ and Ag conductive materials. The $R_{rt}$ values were significantly improved despite the increased resistivity of these Examples vs. the Comparative Examples. Further, the HTCR of each was above 1000 ppm/C.

Cupric oxide CuO or its precursor can optionally be included up to approximately 10% by weight of the resistor composition and may be beneficial for properties such as HTCR and resistivity. Levels higher than approximately 10% could have difficulty in producing uniform fired compositions. Examples of CuO additions at 6 and 10% are shown in Examples 7 and 8, respectively. Low values of $R_{rt}$ were obtained despite the normalized resistivities being in the range of 500-700 milliohms/square.

Bismuth oxide or its precursor can similarly be optionally included up to approximately 20% by weight of the resistor composition. Levels higher than 20% could reduce the fired glass durability. As shown in Example 9, 20% Bi$_2$O$_3$ was added to the composition, with improved $R_{rt}$ at higher resistivity values vs. the Comparative Examples 1-4 and HTCR near 2000 ppm/C.

Example 10 shows the use of both CuO and Bi$_2$O$_3$ added to a system containing Ag, RuO$_2$ and Glass B. Examples 11 and 12 similarly show the use of both CuO and Bi$_2$O$_3$ added to a system containing Ag, RuO$_2$ and Glass F, and Example 13 shows the use of both CuO and Bi$_2$O$_3$ added to a system containing Ag, RuO$_2$ and Glass E.

TABLE 4

|  | 5 | 6 | 7 | 8 | 9 | 10 | 11 | 12 | 13 |
|---|---|---|---|---|---|---|---|---|---|
| Glass A |  |  |  |  |  |  |  |  |  |
| Glass B | 45.00% |  |  |  |  | 32.40% |  |  |  |
| Glass C |  |  |  |  |  |  |  |  |  |
| Glass D |  |  |  |  |  |  |  |  |  |
| Glass E |  |  |  |  |  |  |  |  | 27.40% |
| Glass F |  | 45.00% | 34.00% | 30.00% | 20.00% |  | 27.40% | 32.40% |  |
| CuO |  |  | 6.00% | 10.00% |  | 1.60% | 1.60% | 1.60% | 1.60% |
| Bi$_2$O$_3$ |  |  |  |  | 20.00% | 11.00% | 11.00% | 11.00% | 11.00% |
| RuO$_2$ | 25.00% | 25.00% | 30.00% | 30.00% | 30.00% | 25.00% | 30.00% | 25.00% | 30.00% |
| Ag | 30.00% | 30.00% | 30.00% | 30.00% | 30.00% | 30.00% | 30.00% | 30.00% | 30.00% |
| 200 mesh thickness | 30.5 | 30.1 | 27.9 | 24.6 | 25.3 | 27.6 | 37.2 | 27.4 | 26.5 |
| 325 mesh thickness | 16.4 | 15.6 | 13.9 | 12.4 | 12.9 | 15.3 | 22.2 | 14.2 | 13.3 |
| R(25.4) 200 mesh print | 5600 | 2270 | 666 | 503 | 409 | 1076 | 780 | 1224 | 366 |
| R(25.4) 325 mesh print | 5702 | 2591 | 705 | 542 | 485 | 1252 | 734 | 1410 | 416 |
| HTCR 200 mesh print | 1180 | 2497 | 2671 | 2717 | 2077 | 2110 | 2036 | 2621 | 2691 |

TABLE 4-continued

|  | 5 | 6 | 7 | 8 | 9 | 10 | 11 | 12 | 13 |
|---|---|---|---|---|---|---|---|---|---|
| HTCR 325 mesh print | 1168 | 2535 | 2714 | 2755 | 2040 | 2127 | 2069 | 2629 | 2682 |
| $R_{rt}$ 325 mesh/ 200 mesh | 1.018 | 1.141 | 1.060 | 1.079 | 1.187 | 1.163 | 0.941 | 1.151 | 1.137 |

The invention is not limited to the use of single glasses in the formulation. Two and three glass mixtures are shown in Examples 14-18, all with additions of CuO and $Bi_2O_3$.

TABLE 5

|  | 14 | 15 | 16 | 17 | 18 |
|---|---|---|---|---|---|
| Glass A | 10.00% | 15.00% | 5.00% | 5.00% | 5.00% |
| Glass B |  |  |  |  |  |
| Glass C |  |  | 9.13% |  |  |
| Glass D |  |  |  | 9.13% | 9.13% |
| Glass E |  |  |  |  | 13.27% |
| Glass F | 17.40% | 12.40% | 13.27% | 13.27% |  |
| CuO | 1.60% | 1.60% | 1.60% | 1.60% | 1.60% |
| $Bi_2O_3$ | 11.00% | 11.00% | 11.00% | 11.00% | 11.00% |
| $RuO_2$ | 30.00% | 30.00% | 30.00% | 30.00% | 30.00% |
| Ag | 30.00% | 30.00% | 30.00% | 30.00% | 30.00% |
| 200 mesh thickness | 25.7 | 22.1 | 26.9 | 26.0 | 26.3 |
| 325 mesh thickness | 13.6 | 11.4 | 13.3 | 13.1 | 13.4 |
| R(25.4) 200 mesh print | 392 | 142 | 473 | 439 | 392 |
| R(25.4) 325 mesh print | 484 | 174 | 530 | 506 | 449 |
| HTCR 200 mesh print | 2926 | 2941 | 3014 | 3079 | 3113 |
| HTCR 325 mesh print | 2835 | 2903 | 2907 | 2966 | 3022 |
| $R_{rt}$ 325 mesh/200 mesh | 1.234 | 1.229 | 1.121 | 1.152 | 1.145 |

Examples 19 and 20 and Comparative Example 21 employed 10, 5 and 1% $RuO_2$, respectively, in the resistor composition, and used Glass F plus copper oxide and, in Example 19, bismuth oxide. The value of $R_{rt}$ for Example 20 was 3.34, though this was achieved at a resistivity of 2000 milliohms/square at 25.4 microns dry thickness. The Comparative Example 21 did not produce a measureable resistance with the 325 mesh print, though the 200 mesh print produced a resistivity of 232 milliohms/sq at 25.4 microns dry thickness. Example 22 also employed 5% $RuO_2$ in the resistor composition, and used Glass B. The value of $R_{rt}$ was 6.74 at a sheet resistivity of 190 milliohms/sq at 25.4 microns dry thickness when printed through 200 mesh screen, but that compares favorably to Comparative Example 1 that had an infinite value of $R_{rt}$ at the nearly identical sheet resistivity of 187 milliohms/square at 25.4 microns. Comparative Example 1 was also printed almost four microns thicker than Example 22.

Examples 23-25 employ 5-10% Ag in the resistive composition, and Examples 26 and 27 employ only $RuO_2$ as the conductive material in the resistive composition. Even without Ag the HTCR values were around 2000 ppm/C with the Glass F, both with and without the CuO and $Bi_2O_3$ additions. Additions of 5-10% Ag reduced the resistivity and raised the HTCR values.

TABLE 6

|  | 19 | 20 | 21 | 22 | 23 | 24 | 25 | 26 | 27 |
|---|---|---|---|---|---|---|---|---|---|
| Glass A |  |  |  |  |  |  |  |  |  |
| Glass B |  |  |  | 43.20% |  |  |  |  |  |
| Glass C |  |  |  |  |  |  |  |  |  |
| Glass D |  |  |  |  |  |  |  |  |  |
| Glass E |  |  |  |  |  |  |  |  |  |
| Glass F | 27.40% | 33.00% | 33.00% |  | 37.40% | 25.73% | 26.57% | 40.00% | 27.40% |
| CuO | 1.60% | 2.00% | 2.00% |  | 1.60% | 1.60% | 1.60% |  | 1.60% |
| $Bi_2O_3$ | 11.00% |  |  |  | 11.00% | 11.00% | 11.00% |  | 11.00% |
| $RuO_2$ | 10.00% | 5.00% | 1.00% | 5.00% | 40.00% | 51.67% | 55.83% | 60.00% | 60.00% |
| Ag | 50.00% | 60.00% | 64.00% | 51.80% | 10.00% | 10.00% | 5.00% |  |  |
| 200 mesh thickness | 23.0 | 21.6 | 21.3 | 23.4 | 33.2 | 26.0 | 27.6 | 22.1 | 29.0 |
| 325 mesh thickness | 13.3 | 12.5 | 11.6 | 14.3 | 16.3 | 13.8 | 14.4 | 12.1 | 14.5 |
| R(25.4) 200 mesh print | 2363 | 2252 | 232 | 190 | 1177 | 460 | 499 | 766 | 685 |
| R(25.4) 325 mesh print | 2964 | 7519 | Offscale | 1282 | 1085 | 457 | 479 | 799 | 662 |
| HTCR 200 mesh print | 2412 | 2504 | 3562 | 3517 | 2585 | 2948 | 2662 | 2023 | 2014 |
| HTCR 325 mesh print | 2413 | 2359 | Offscale | 2845 | 2594 | 2837 | 2611 | 2042 | 1974 |
| $R_{rt}$ 325 mesh/200 mesh | 1.254 | 3.34 | Infinite | 6.74 | 0.922 | 0.993 | 0.960 | 1.043 | 0.966 |

The use of the inventive resistor paste compositions is not restricted to firing onto aluminum oxide substrates. Examples 28-30 show one resistor paste composition fired directly onto alumina, or onto alumina with two layers of QM44 previously fired onto it, or onto 430 stainless steel with one layer of 3500N dielectric previously fired onto the 430 stainless steel then one layer QM44 dielectric fired onto the 3500N, respectively.

TABLE 7

|  | 28 Alumina | 29 Qm44-QM44-Alumina | 30 QM44-3500N-430 SS |
|---|---|---|---|
| Glass A | | | |
| Glass B | | | |
| Glass C | | | |
| Glass D | | | |
| Glass E | | | |
| Glass F | 24.90% | 24.90% | 24.90% |
| CuO | 1.60% | 1.60% | 1.60% |
| $Bi_2O_3$ | 11.00% | 11.00% | 11.00% |
| $RuO_2$ | 47.50% | 47.50% | 47.50% |
| Ag | 15.00% | 15.00% | 15.00% |
| 200 mesh thickness | 24.1 | 26.6 | 22.8 |
| 325 mesh thickness | 13.1 | 14.6 | 14.2 |
| R(25.4) 200 mesh print | 390 | 355 | 316 |
| R(25.4) 325 mesh print | 412 | 376 | 358 |
| HTCR 200 mesh print | 2932 | 2998 | 3061 |
| HTCR 325 mesh print | 2878 | 2999 | 3063 |
| $R_{tr}$ 325 mesh/200 mesh | 1.054 | 1.058 | 1.134 |

One natural outcome of improving the resistance thickness ratio $R_{tr}$ is that the overall variation of the resistance values is reduced. The coefficient of variation (CV) of Example 28 was 0.62% for the 200 mesh print and 1.19% for the 325 mesh print. The coefficient of variation is defined as the standard deviation of the resistance divided by the average of the resistance. The CV measurements for Example 28 employed 20 parts instead of five parts for the other examples. The CV for Comparative Example 1 was 2.5% for the 200 mesh print, the CVs for Comparative Example 2 were 3.4% for the 200 mesh print and 8.6% for the 325 mesh print, the CV for Comparative Example 3 was 12.1% for the 200 mesh print, and the CVs for Comparative Example 4 were 2.2% for the 200 mesh print and 35.5% for the 325 mesh print.

What is claimed is:

1. A thick film resistor paste composition comprising a resistor composition dispersed in an organic vehicle, said resistor composition comprising:
   (a) 3 to 60% by weight $RuO_2$ conductive material,
   (b) 5 to 75% by weight Ag conductive material,
   (c) 15 to 60% by weight glass frit wherein the glass comprises by weight 25-45% $SiO_2$, 2-15% $Al_2O_3$, 0-3% $ZrO_2$, 0-8% $B_2O_3$, 5-15% CuO, 0-8% BaO, 0-3% $P_2O_5$, and 20-50% $Bi_2O_3$, and optionally
   (d) 0 to 10% by weight copper oxide or precursor thereof, and
   (e) 0 to 20% by weight bismuth oxide or precursor thereof
   wherein said resistor composition when printed to a dry thickness and fired at a temperature between 750° C. and 950° C. achieves a sheet resistivity between 10 and 10,000 milliohms/square and a hot temperature coefficient of resistivity of 1000 ppm/C or higher.

2. The composition of claim 1 wherein said Ag conductive material is selected from the group consisting of Ag and mixtures of Ag and Pd, wherein the mixture of Ag and Pd comprises 90% to 99.99% by weight Ag and 0.01% to 10% by weight Pd, based upon the weight of the mixture of Ag and Pd.

3. The composition of claim 1 comprising (a) 10 to 50% by weight $RuO_2$ conductive material.

4. The composition of claim 1 further comprising (d) up to 10% by weight copper oxide or precursor thereof.

5. The composition of claim 1 further comprising (e) up to 20% by weight bismuth oxide or precursor thereof.

6. A fired resistor composition according to any of claims 1 to 5.

7. The method of forming a fired resistor composition on a substrate comprising the steps of:
   (a) forming on said substrate a thin layer of thick film resistor paste according to claim 1,
   (b) drying said thin layer,
   (c) firing said dried layer between 750° C. and 950° C. to form a fired resistor composition with a sheet resistivity between 10 and 10,000 milliohms/square and a hot temperature coefficient of resistivity of 1000 ppm/C or higher.

8. The method of claim 7 wherein said fired resistor composition has a resistance thickness ratio ($R_{tr}$) value between 0.75 and 1.50.

9. The method of claim 7 wherein said dried thin layer formed in step (b) has a dry thickness of 50 microns or less.

10. The method of claim 7 wherein said thick film resistor paste composition has Ag conductive material is selected from the group consisting of Ag and mixtures of Ag and Pd, wherein the mixture of Ag and Pd comprises 90% to 99.9% by weight Ag and 0.1% to 10% by weight Pd, based upon the weight of the mixture of Ag and Pd.

11. The method of claim 7 wherein said thick film resistor paste composition further comprises up to 10% by weight copper oxide or precursor thereof.

12. The method of claim 7 wherein said thick film resistor paste composition further comprises up to 20% by weight bismuth oxide or precursor thereof.

13. A thick film resistor paste composition according to claim 1 wherein said dry thickness is in the range of 3 to 50 microns.

* * * * *